(12) United States Patent
Paetz et al.

(10) Patent No.: US 10,788,171 B2
(45) Date of Patent: Sep. 29, 2020

(54) HANDHELD LIGHT-EMITTING DEVICE, IN PARTICULAR A WORK LIGHT

(71) Applicant: Robert Bosch GmbH, Stuttgart (DE)

(72) Inventors: Manuela Paetz, Stuttgart (DE); Anja Koenig, Leinfelden-Echterdingen (DE); Thorsten Schaal, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/368,075

(22) Filed: Dec. 2, 2016

(65) Prior Publication Data
US 2017/0159897 A1 Jun. 8, 2017

(30) Foreign Application Priority Data
Dec. 4, 2015 (DE) .......................... 10 2015 224 361

(51) Int. Cl.
*F21L 4/08* (2006.01)
*F21L 4/00* (2006.01)
*F21V 23/00* (2015.01)
*H04B 1/40* (2015.01)
*H04W 4/00* (2018.01)
*F21W 131/10* (2006.01)

(52) U.S. Cl.
CPC ................ *F21L 4/08* (2013.01); *F21L 4/00* (2013.01); *F21V 23/009* (2013.01); *H04B 1/40* (2013.01); *F21W 2131/1005* (2013.01); *H04W 4/00* (2013.01)

(58) Field of Classification Search
CPC ...... F21L 4/08; F21L 4/00; H04B 1/40; F21V 23/009

USPC ........................................................ 362/183
See application file for complete search history.

(56) References Cited

U.S. PATENT DOCUMENTS

| | | | | | |
|---|---|---|---|---|---|
| 3,070,748 | A | * | 12/1962 | Worobey | H04B 1/086 307/150 |
| 3,809,882 | A | * | 5/1974 | Wetmore | F21L 4/00 362/183 |
| 4,398,139 | A | * | 8/1983 | Prinsze | H02J 7/0047 320/114 |
| 4,514,790 | A | * | 4/1985 | Will | F21L 4/08 320/111 |
| 7,553,051 | B2 | * | 6/2009 | Brass | F21L 4/00 362/373 |
| 8,439,515 | B1 | * | 5/2013 | Maxik | F21S 9/04 362/183 |
| 9,080,736 | B1 | * | 7/2015 | Salzinger | H05B 37/0218 |
| 2004/0057235 | A1 | * | 3/2004 | Li | H04M 1/22 362/253 |
| 2007/0171082 | A1 | * | 7/2007 | Melnik | F21L 4/005 340/574 |
| 2015/0311747 | A1 | | 10/2015 | Chu | |

FOREIGN PATENT DOCUMENTS

KR 20030090333 A 11/2003
WO 2014142383 A1 9/2014

* cited by examiner

*Primary Examiner* — Bryon T Gyllstrom
(74) *Attorney, Agent, or Firm* — Norton Rose Fulbright US LLP; Gerard Messina

(57) ABSTRACT

A handheld light-emitting device having a housing and a radio module is described, the radio module being designed to receive information from at least one external interface and/or transmit it to at least one external interface. Provision is made that the radio module is disposed in the housing of the handheld light-emitting device.

21 Claims, 5 Drawing Sheets

HANDHELD LIGHT-EMITTING DEVICE, IN PARTICULAR A WORK LIGHT

FIELD OF THE INVENTION

The present invention relates to a handheld light-emitting device, in particular to a work light.

BACKGROUND INFORMATION

Handheld illumination devices, in particular work lights, are known in principle and as a rule are supplied with power via a power grid connector. Alternatively, battery-powered devices allow a great deal of working flexibility, since they are, in particular, independent of grid power. It is thereby also possible, for example, to conveniently perform jobs outside, so that provision is often made to utilize battery packs in the context of operation of a handheld light-emitting device.

Battery packs of this kind are known in principle and have rechargeable batteries, as a rule a plurality of rechargeable cells connected in parallel or in series. In the context of this Application a "battery pack" is therefore to be understood as a battery pack, preferably made up of several battery cells electrically connected to one another, that can store electrical energy and that supplies the energy needed for operation of an electrical product and/or of a handheld power tool. For example, three cylindrical lithium ion cells connected in series, each of e.g. 3.6 V, can be provided, for a total voltage of 10.8 V.

Handheld light-emitting devices that have a monitoring module that, for example, monitors the charge status of the battery pack are known from the existing art. It proves to be disadvantageous in this context that such monitoring modules are of only limited benefit because the monitored data are displayed only on site.

SUMMARY

An object on which the present invention is based is that of improving on the disadvantages recited above and furnishing a handheld light-emitting device, in particular a work light, of the kind recited initially in which transmission of data, parameters, or the like from and to an external interface is reliably enabled even over longer distances with simple design outlay, and at the same time an adaptation to other circumstances with regard to a corresponding connection between the handheld light-emitting device and an external interface can be quickly and easily made available. A further object of the invention is a handheld light-emitting device, in particular a work light, in which a communication interface for a handheld light-emitting device can be made available, installed, and replaced with little outlay, the intention being that the installation and/or replacement process can be carried out as simply and inexpensively as possible.

The invention discloses a handheld light-emitting device, in particular a work light, having a radio module, the radio module being designed to receive information from at least one external interface and/or to transmit information and/or control instructions to at least one external interface. Provision is made according to the present invention that the radio module is disposed in a housing of the handheld light-emitting device, provision being made according to the present invention that the radio module can be disposed in the housing of the handheld light-emitting device either fixedly as a fixedly integrated radio module, or as a detachable and thus separately removable radio module.

The radio module in this context is an electrical component that is used to establish a communication connection via a radio network in a wide variety of sectors. Radio modules are already used, for example, for applications in a so-called "machine-to-machine" (M2M) environment, for example in the field of industrial automation, in motor vehicles to support applications in the telematics field, or also for remote querying of consumer meters such as electric, gas, or water meters. In general, the use of a radio module makes it possible to perform a wireless data transfer via a radio network, thereby in particular avoiding outlays for wiring that would otherwise be necessary. Transmission of data, parameters, or the like from and to an external interface is thereby reliably enabled with little design outlay.

Preferably the handheld light-emitting device is supplied with energy via a first energy reservoir, in particular via a battery pack of a handheld power tool or via a grid power connection. Advantageously, this first energy reservoir is a replaceable slide-in or plug-in battery pack disposed on the housing. In order to allow the radio module to be supplied with sufficient power in simple fashion, according to a preferred refinement of the invention provision is made that the radio module is supplied with energy via the power supply of the handheld light-emitting device.

This can be ensured, for example, by way of a detachable attachment of the radio module to an electronic control system of the handheld light-emitting device, with the result that on the one hand power can be supplied to the radio module via the power supply of the electrical product, and on the other hand the battery status of the first energy reservoir and/or the remaining running time of the handheld light-emitting device resulting therefrom can be conveyed to an external interface.

In a particularly preferred variant embodiment the handheld light-emitting device has a second energy reservoir, the radio module being electrically connected to the first energy reservoir and/or to the second energy reservoir. Provision is made according to the present invention that in the case in which the first energy reservoir is present and possesses sufficient energy, the radio module is supplied with energy via the first energy reservoir, and in any other case it is powered via the second energy reservoir. Energy supply to the radio module can thereby be ensured at all times.

Advantageously, the second energy reservoir is also rechargeable. It is correspondingly of particular advantage that in the case in which the first energy reservoir is present and possesses sufficient energy, the second energy reservoir is charged with energy via the first energy reservoir. Transmission of the battery status of the second energy reservoir to an external interface is possible by way of the radio module, so that a user of the handheld light-emitting device can react in correspondingly timely fashion.

Preferably the housing of the handheld light-emitting device has a receiving opening in which the radio module and/or the second energy reservoir can be removably received. The radio module and/or the second energy reservoir can thereby be mounted detachably on the handheld light-emitting device, the receiving opening enabling simple and inexpensive replacement of the radio module and/or second energy reservoir disposed in the housing of the handheld light-emitting device.

Advantageously, the housing configures the receiving opening directly in the housing wall of the handheld light-emitting device, and the receiving opening can be embodied in a cup shape or box shape having a bottom surface.

Advantageously, the receiving opening is closable by a cover, the cover preferably following the contour of the housing wall and terminating flush therewith. The cover can be embodied from a variety of plastic materials, for example PA6, PA6.6, polycarbonate (PC), acrylonitrile-butadiene-styrene copolymer (ABS), or a material mix of different plastics, and/or can be glass fiber-reinforced. Preferably the cover encompasses the same material as the housing of the handheld light-emitting device.

In order to make possible reliable but simple access to the receiving opening and to the second energy reservoir disposed therein, and/or to the radio module, it is advantageous if the cover has a slot-shaped depression and is detachably immobilized preferably rotationally, in particular via a threaded closure or bayonet closure. Thanks to the slot-shaped depression, the cover can easily be opened using a coin or a screwdriver. The bayonet closure can easily be actuated, and nevertheless ensures secure closing of the receiving opening. Alternatively, the cover can also be fastened on the housing by way of at least one connecting element, in particular by way of at least one screw. A further embodiment is a cover, mounted pivotably around a pivot axis, which can be detachably immobilized on the housing on a side of the cover located oppositely from the pivot axis, by latching, threading, wedging, or clamping. The possibility of the cover falling off the housing, or of loss of the cover, can thereby be effectively be counteracted.

It is further advantageous if the second energy reservoir is disposed in the receiving opening by way of spring impingement, with the result that secure contact with the radio module and/or with a contact circuit board can be ensured. Provision can be made in principle that the corresponding spring element is disposed between the cover and the second energy reservoir, or between the bottom surface of the receiving opening and the second energy reservoir, in order to press the energy reservoir against the contact terminals, provided inside the receiving opening, when the cover is closed. In a preferred embodiment the second energy reservoir is configured removably and/or as a kind of button battery.

The second energy reservoir can be replaced by opening the cover, so that a user can remove the second energy reservoir from the receiving opening through the opening and replace it with a new, charged energy reservoir. Closing the cover again causes the energy reservoir to be securely held inside the receiving opening. It is thereby possible to avoid replacement of the entire radio module together with the second energy reservoir, and to ensure continuous operation in simple fashion. Alternatively, it is conceivable for the second rechargeable energy reservoir to be integrated fixedly inside the housing; in this case the second energy reservoir is electrically connected to the energy supply of the handheld light-emitting device, so that the second energy reservoir can be recharged using the energy made available by the power grid or by the battery pack of the handheld light-emitting device. In this case an electronic control system is advantageously provided inside the handheld light-emitting device, which system, depending on the energy supply to the handheld light-emitting device, charges the second energy reservoir and/or merely allows energy to be supplied to the radio module via the energy supply of the handheld light-emitting device, with the result that continuous operation can be ensured in a simple manner.

Advantageously, the radio module is connected to an electronic control system of the handheld light-emitting device or is integrated thereinto so that, for example, the circuit of the radio module can be accommodated on the electronic control system of the handheld light-emitting device. Alternatively, the radio module can also have a dedicated electronic control system.

In the case of a removable radio module, the radio module has at least one connecting element, for example a SIM card contacting system and/or knife contacts, for example for contacting a battery pack, for contacting at least one mating connecting element of the electronic control system of the handheld light-emitting device. Provision is correspondingly made that in the case of a removable radio module, a separate interface is disposed in the handheld light-emitting device; advantageously, this separate interface is disposed directly on the electronic control system of the handheld light-emitting device.

Provision can alternatively be made, in particular in the context of a fixedly installed radio module, that the radio module has at least one dedicated interface circuit board for wire-based data interchange with the electronic control system of the handheld light-emitting device, the interface circuit board of the radio module having at least one, preferably two connecting elements, in particular plug connections, such that at least one connecting element ensures data interchange with and/or energy supply by way of the electronic control system of the handheld light-emitting device, and/or a further connecting element contacts in wire-based fashion a contact circuit board of the second energy reservoir. According to the present invention, for a fixedly installed radio module of this kind provision is made that both the electronic control system of the handheld light-emitting device and the radio module respectively have plug connectors and mating plug connectors in order to ensure data interchange between the interface circuit board of the radio module or between the electronic control system of the radio module and/or the electronic control system of the handheld light-emitting device. The plug connectors and the corresponding mating plug connectors are in turn connected to one another via leads. Alternatively, the radio module can be directly connected to the electronic control system of the handheld light-emitting device detachably, for example in plugged fashion, or fixedly, for example in soldered fashion, in order to enable reliable attachment and transfer.

Provision is made according to the present invention that the interface circuit board is connected to the electronic control system of the handheld light-emitting device by way of a plug connection and/or by way of spring contacts, and/or in wire-based soldered fashion, and/or insertably, and in particular is thread-mounted and/or clamped, or is non-detachably disposed inside the housing. Advantageously, for protection from external influences the radio module is encapsulated within the housing, together with the electronic control system of the handheld light-emitting device or separately. The radio module can furthermore be pre-installed inside the housing, retrofitted, or replaced. It is particularly advantageous in this context if the radio module is disposed replaceably, directly inside the receiving opening.

In a preferred embodiment of the assemblage according to the present invention the radio module receives and/or transmits a radio signal based on electromagnetic waves, for example a Bluetooth signal, in particular a Bluetooth low energy signal, a WLAN signal, or an NFC signal. A WLAN module, for example an 868-MHz module, a 915-MHz module, or also a Bluetooth module, can be used as a preferred exemplifying embodiment of such a radio module. Further types of radio modules are also usable. The radio network can be a communication network of any wireless communication standard, for example Wireless Local Area Network (WLAN), Bluetooth, Global System for Mobile Communications (GSM), General Packet Radio Service (GPRS), or Universal Mobile Telecommunications System (UMTS). In addition, wireless communication networks having a comparatively short range and specifically adapted to corresponding requirements are increasingly being used in particular in the industrial automation sector; these are also referred to as a Wireless Personal Area Network (WPAN). Examples thereof that may be recited are radio networks according to one of the standards IEEE 802.15.4 or WirelessHART.

Advantageously, an active radio module sends out a signal every eight seconds. Alternatively, and depending on the energy supply, the signal can also be sent out at shorter or longer intervals. In particular when energy is supplied by the second energy reservoir, the radio signal can be sent out, for example, every ten, 20, or 30 seconds, whereas when energy is supplied by the first energy reservoir, the radio module sends out a signal, for example, every four seconds or even every second. The corresponding radio module can in particular be connected serially to the electronic control system, to a measurement device for measuring various electrical variables, or the like. Such variables are, for example, indications such as codes with which an identification of the product can be enabled, or indications regarding the on/off status, the duration of the on/off status, the luminous intensity, the charge capacity of the battery pack mounted on the handheld light-emitting device, a GPS signal regarding the current location and/or changes in location, etc.

Advantageously, control instructions such as switching on, switching off, and/or dimming are transmitted via the external interface and the radio module to the electronic control system of the handheld light-emitting device. A defined time at which such a switching operation, for example on, off, and/or dimming, is to take place, and/or a time span during which a specific switching state such as on, off, and/or dimmed is to exist, can furthermore be defined and can be transmitted via the radio module to the electronic control system of the electrical product. It is furthermore possible for the electrical product to be blocked by way of the radio module by a previously defined user, and for access by an unauthorized user to be prevented. It is correspondingly also possible that the blocked status can be queried by a user. Provision can furthermore be made according to the present invention that the radio module is designed to carry out an evaluation of local time measurements and/or of GPS signals in order to locate the handheld light-emitting device.

In a particularly advantageous embodiment the radio module constitutes, with the second energy reservoir, an independent module that is introducible separately and detachably into the housing of the handheld light-emitting device, the module being mounted on the housing detachably, for example by way of a threaded connection or using other connecting elements. The radio module is thus of particularly compact configuration and can quickly and easily be installed, replaced, and/or retrofitted, so that replacement and/or repair can also be effected quickly, simply, and inexpensively.

The assemblage according to the present invention is usable for any types of handheld light-emitting devices. In a particularly preferred embodiment the handheld light-emitting device is configured as a portable handheld light-emitting device, in particular as a work light, and the radio module and thus the handheld light-emitting device, the type of handheld light-emitting device, and/or the light-emitting means used therein can be identified on the basis of a code that is sent out.

The handheld light-emitting device according to the present invention can also be provided in a system. A handheld light-emitting device, together with an external unit that is designed to receive information from the radio module and/or transmit it to the radio module, correspondingly also constitutes a further subject of the invention. Provision can be made according to the present invention that the external unit is a smartphone or an electrical data processing system. This system makes possible, with a simple design outlay and over longer distances, secure interchange of data, parameters, or the like between the handheld light-emitting device and the external unit, with the result that, for example, monitoring and/or control of the operating modes and/or retrieval of the handheld light-emitting device can be simplified. In addition, by way of a handheld light-emitting device according to the present invention or in a system according to the present invention, multiple handheld light-emitting devices can be grouped and can be controlled together by way of the external interface and the respective radio modules. It is particularly advantageous in this context that the handheld light-emitting devices can communicate directly with one another by way of the external interface and/or via their radio modules.

Further features, possible applications, advantages, and configurations of the invention are evident from the description below of the exemplifying embodiments of the invention which are depicted in the Figures. The description, the pertinent Figures, and the Claims contain numerous features in combination. One skilled in the art will also consider these features, including in particular the features of different exemplifying embodiments, individually and will combine them into useful further combinations. It is noteworthy in this context that the features presented are merely descriptive in nature and can also be used in combination with features of other refinements described above, and are not intended to limit the invention in any form.

DETAILED DESCRIPTION

Figure 1:
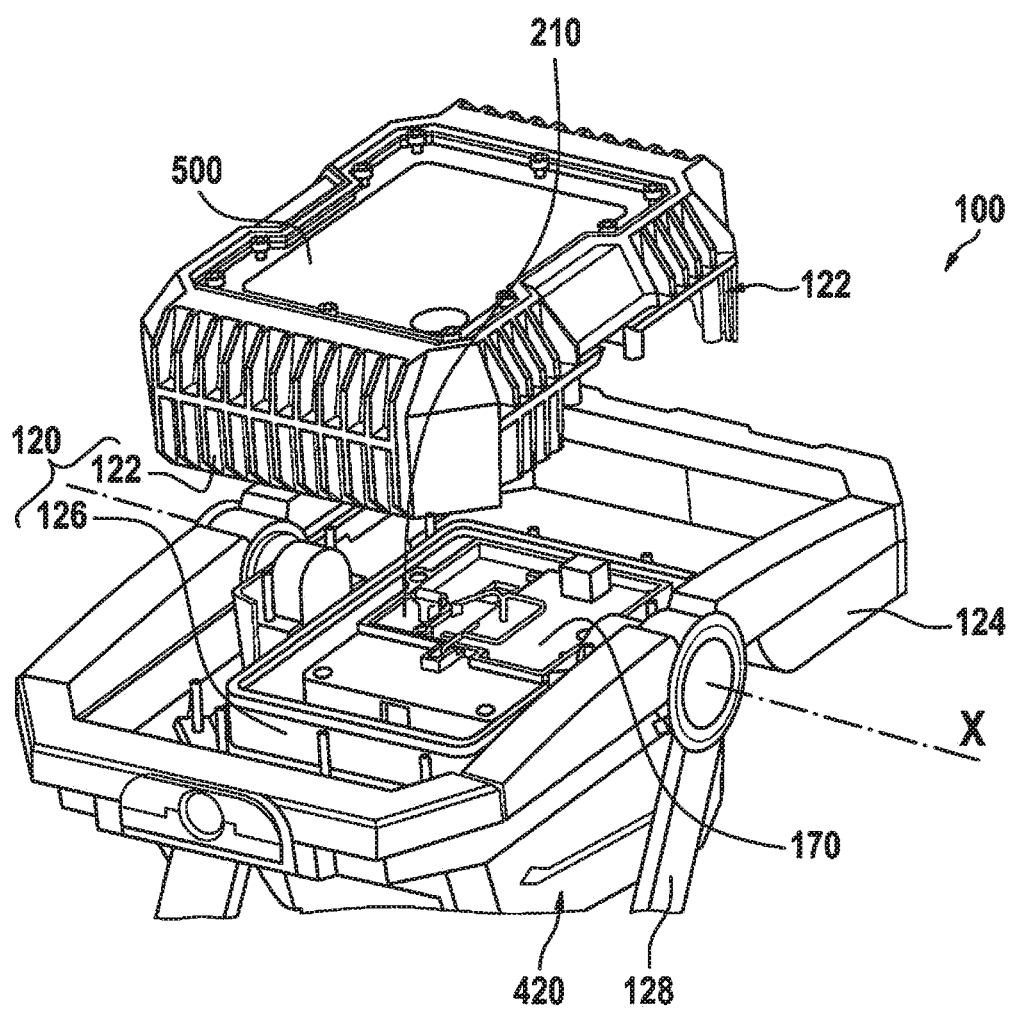
FIG. 1 is a perspective top view of a first variant embodiment of a handheld light-emitting device according to the present invention having an inserted radio module.

FIG. 1 shows a handheld light-emitting device 100 according to the present invention that is configured, in the embodiment depicted, as a work light. According to the embodiment depicted, handheld light-emitting device 100 is mechanically and electrically connected to a battery pack 400 for cordless power supply. It is noted in principle that the present invention is not limited to work lights, but instead can be applied to different handheld light-emitting devices 100 that are operated with a power grid connector or with a first energy reservoir 400 depicted in FIGS. 3 and 4, in particular a battery pack, for cordless energy supply. In FIG. 1 this first energy reservoir 400 is disposed under a cover 420 configured in sealed and closed fashion, and is thus not evident in detail. Cover 420 is advantageously configured in such a way that it seals both battery pack 400 and connection interface 380 located therebeneath, and thus also handheld light-emitting device 100, with respect to external influences such as rainwater and/or dust, with the result that handheld light-emitting device 100 obtains an IP (Ingress Protection or International Protection) classification.

Handheld light-emitting device 100 has a housing 120 having a carrying handle 124 and a foldable support foot 128. In the embodiment depicted, both support foot 128 and carrying handle 124 are mounted on handheld light-emitting device 100 pivotably around a rotation axis x. Housing 120 furthermore has a first housing portion 122 and a second housing portion 126, in whose interior a light-emitting means (not depicted), for example a number of light-emitting diodes, can be disposed in protected fashion so that they are protected from environmental influences. First housing portion 122 furthermore has a transparent hood 500 through which the light radiated by the light-emitting means can penetrate. The light-emitting means have control applied to them by a control system, e.g. an electronic control system 170, that encompasses, for example, a switching power supply or other similar suitable electrical means. The light-emitting means can be switched on and off by way of an electrical switch (not depicted in detail). The electrical switch is disposed in protected fashion in the interior of housing 120 and is actuatable via a pressure surface 190 visible in FIG. 3, which in the embodiment depicted is disposed on handle 124.

Electronic control system 170 of handheld light-emitting device 100 or of the work light is preferably configured so that the light-emitting means are switchable in several, for example three, brightness stages. The light-emitting means of handheld light-emitting device 100 can correspondingly, for example, be switched on successively, switched to a higher or lower brightness stage, and/or switched off, by successive button confirmations or by holding down pressure surface 190. Other switches, for example an additional "brightness switch" in the form of a slide controller, rotary switch, or the like, are of course alternatively also conceivable. Transparent hood 500 is provided on a front side of housing 120. Support foot 128 serves inter alia for placement of handheld light-emitting device 100 on a substrate, and in that context advantageously serves to ensure stability. Disposed inside housing 120 are on the one hand electronic control system 170 and on the other hand radio module 210, radio module 210 being designed to receive information from at least one external interface (not depicted) and/or to transmit it to the external interface. Electronic control system 170 is electrically connected to the light-emitting means. Radio module 210 is connected to electronic control system 170 of handheld light-emitting device 100, or alternatively can also be integrated directly thereinto. Radio module 210 can furthermore have at least one dedicated interface circuit board and advantageously also a dedicated data memory, interface circuit board 213 being disposed inside housing 120 detachably, in particular in thread-mounted and/or clamped fashion, or nondetachably.

In order to connect electronic control system 170 to radio module 210, both electronic control system 170 and radio module 210 respectively have plug connectors or mating plug connectors. The plug connectors and the corresponding mating plug connectors are connected to one another via leads. Alternatively, radio module 210 can be directly inserted or soldered onto the electronic control system in order to enable secure attachment. Radio module 210 transmits a radio signal, for example a Bluetooth signal, a WLAN signal, or an NFC signal. For example, a WLAN module, for example an 868-MHz module or a 915-MHz module, or also a Bluetooth module, can be used as a preferred exemplifying embodiment of such a radio module. Further types of radio modules are likewise usable. The radio network can be a communication network of any wireless communication standard, for example a Wireless Local Area Network (WLAN), Bluetooth, Global System for Mobile Communications (GSM), General Packet Radio Service (GPRS), or Universal Mobile Telecommunications System (UMTS). It is furthermore particularly advantageous if radio module 210 is designed to carry out an evaluation of local time measurements and/or of GPS signals in order to locate handheld light-emitting device 100.

Figure 2:
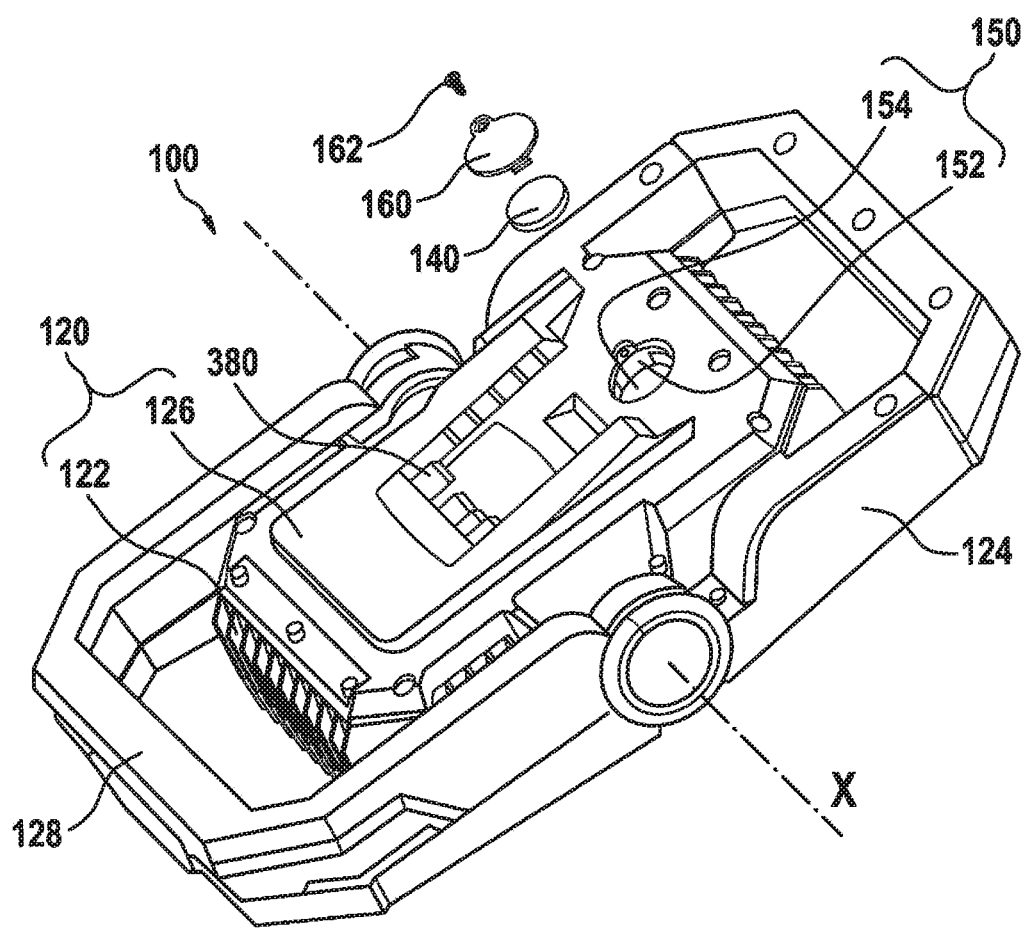
FIG. 2 is a perspective bottom view of the handheld light-emitting device according to the present invention of FIG. 1, having a second energy reservoir without a battery pack.
Figure 3:
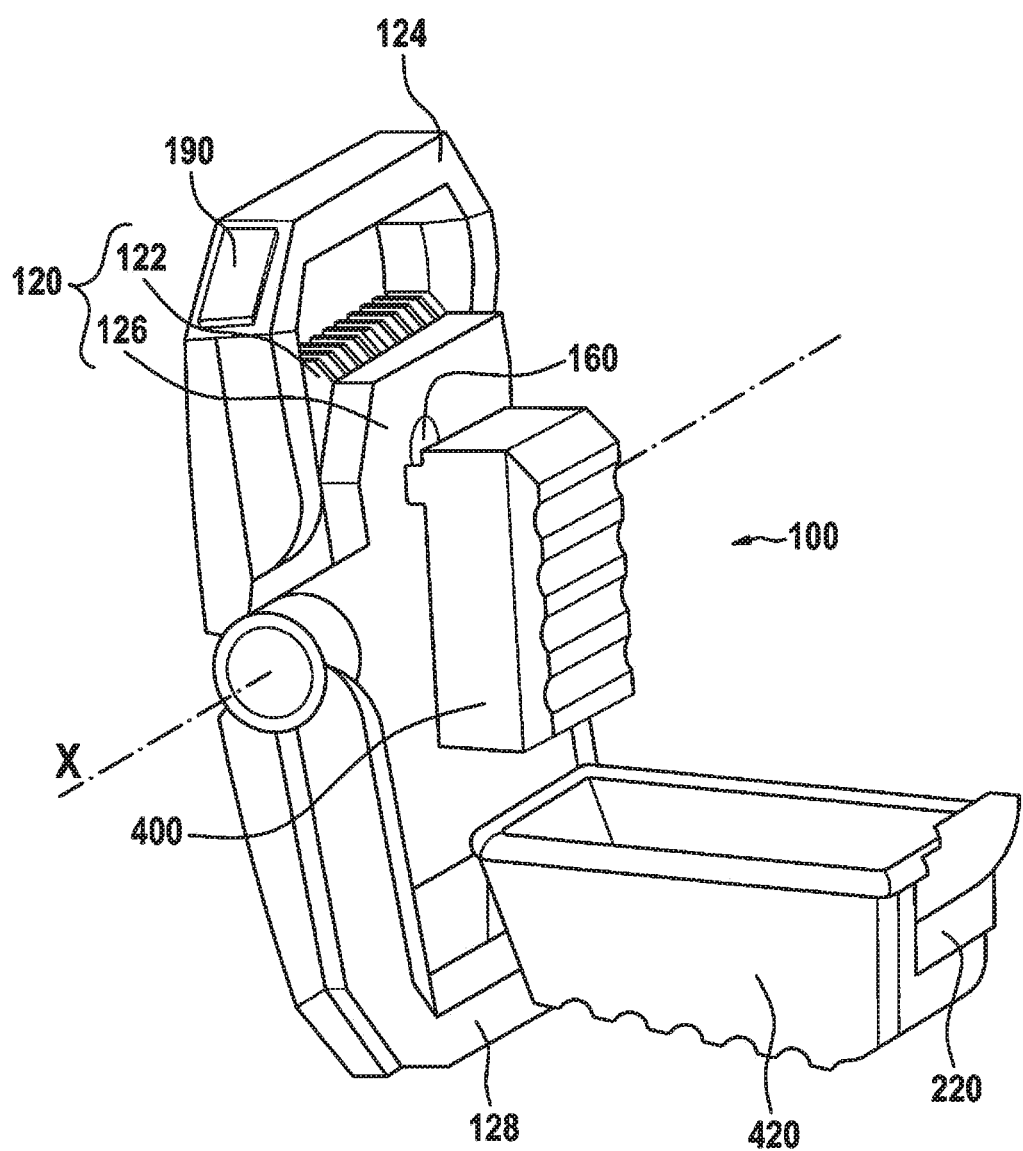
FIG. 3 shows the handheld light-emitting device according to the present invention of FIG. 1 with a battery pack inserted.
Figure 4:
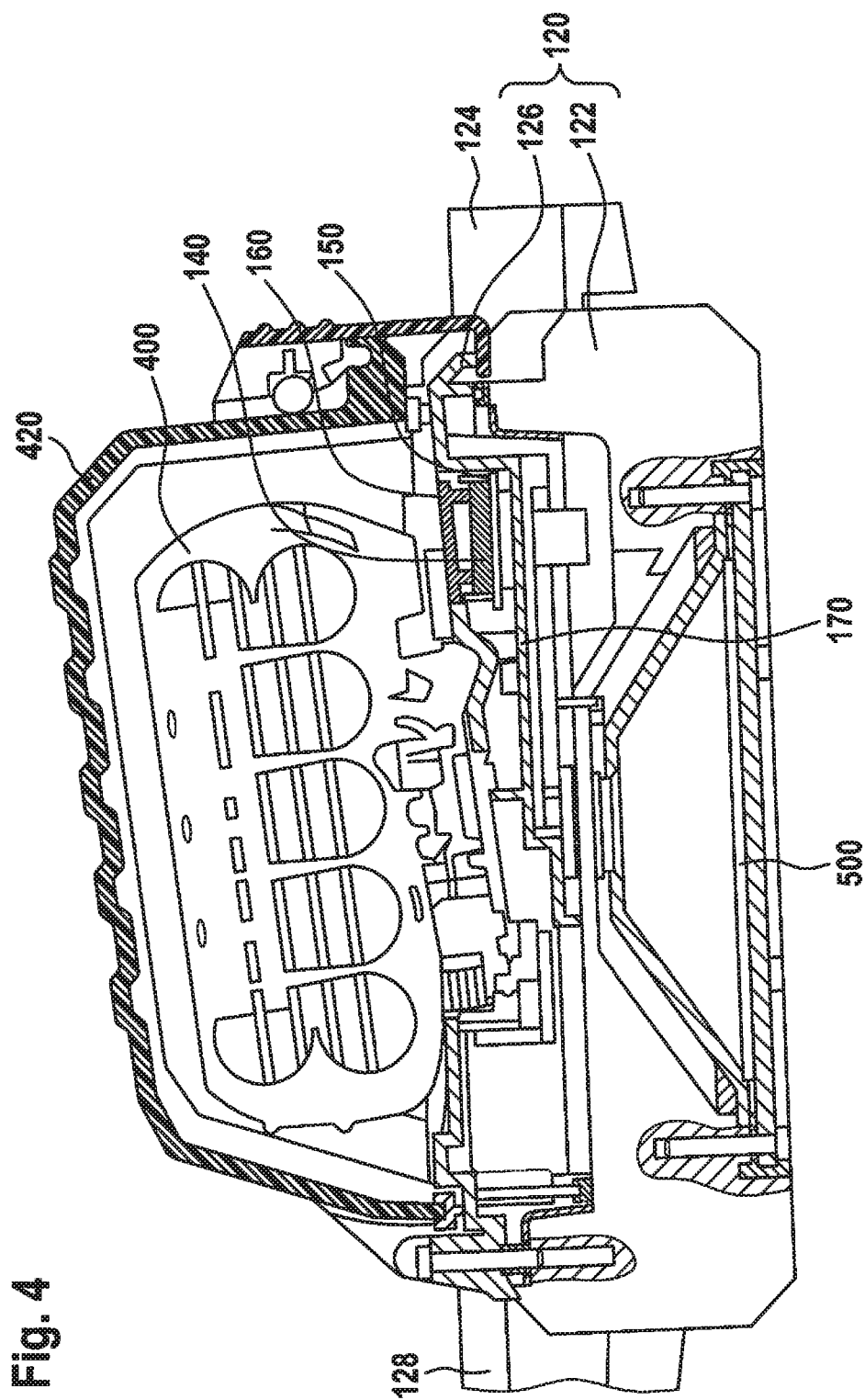
FIG. 4 is a section view through the handheld light-emitting device according to the present invention of FIG. 2.

FIGS. 2 and 3 are bottom views of handheld light-emitting device 100 without IP cover 420 or with IP cover 420 swung aside, depicting first energy reservoir 400 disposed under it. FIG. 2 shows connector interface 380 for contacting a mating interface of battery pack 400, and a receiving opening 150 for receiving a second energy reservoir 140 and/or, as depicted in FIGS. 4 and 6, radio module 210. In the embodiment depicted, receiving opening 150 is cup-shaped. Receiving opening 150 can also alternatively have a different shape, for example can be box-shaped. The cup-shaped receiving opening 150 that is depicted has a peripheral side wall 152 and a bottom surface 154. In the embodiments depicted, second energy reservoir 140 is embodied as a button cell battery. Receiving opening 150 can be closed off using a cover 160. In the variant depicted in FIG. 2, cover 160 is additionally secured on housing 120 by way of a connecting element 162, for example a screw. In particular in the context of the permanently installed radio module 210 that is depicted, provision can be made that a contact circuit board (not depicted in detail) for contacting second energy reservoir 140 is disposed inside receiving opening 150, in particular in the region of the bottom surface.

The section view depicted in FIG. 4 shows battery pack 400 and second energy reservoir 140, disposed in receiving opening 150, under IP cover 420.

In an alternative variant that is not depicted, radio module 210 can have a dedicated interface circuit board and a dedicated data memory, or can be integrated into electronic control system 170 of handheld light-emitting device 100. The interface circuit board is connected to electronic control system 170 by way of a plug connection and/or via spring contacts, contact circuit board 213 once again being disposed detachably, in particular in thread-mounted and/or clamped fashion, or nondetachably, inside housing 120.

Although this is not illustrated in the Figures, it should be mentioned in principle that radio module 210 is connected electrically to first energy reservoir 400, for example to the battery pack or the external power supply, and/or to second energy reservoir 140. For the case in which first energy reservoir 400 is present, in particular as battery pack 400 or as an external power supply, and possesses sufficient energy, radio module 210 is supplied with energy via first energy reservoir 400, whereas in any other case radio module 210 is supplied with energy via second energy reservoir 140, so that a supply of energy to radio module 210 is ensured at all times. It is correspondingly advantageous if second energy reservoir 140 is likewise a rechargeable energy reservoir 140, and if—in the case in which first energy reservoir 400 is present and possesses sufficient energy—it is charged with energy via first energy reservoir 400. In the case of a rechargeable second energy reservoir 140 it is furthermore possible for it to be integrated fixedly within housing 120 (not depicted).

Figure 5:
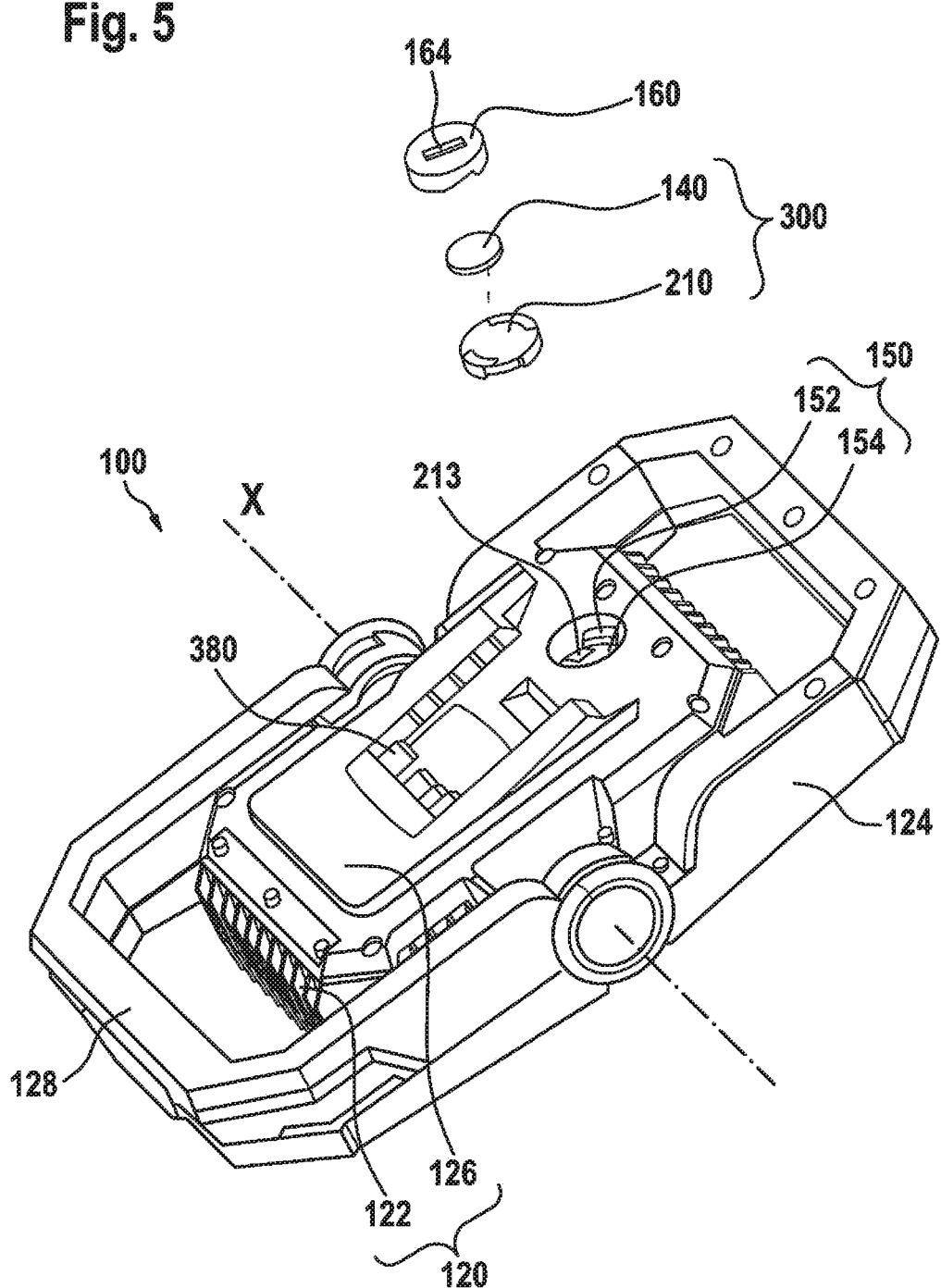
FIG. 5 is a perspective bottom view of the handheld light-emitting device according to the present invention of FIG. 1 without a battery pack, with a radio module disposed in the receiving opening.

As depicted in FIG. 5, radio module 210 can be embodied as module 300 and can be disposed detachably in receiving opening 150 of handheld light-emitting device 100. In the variant embodiment depicted, module 300 encompasses substantially the second, dedicated energy reservoir 140 and radio module 210; mating connecting element 213 (not depicted in detail) of the interface circuit board, integrated into handheld light-emitting device 100, of electronic control system 170 of handheld light-emitting device 100 is already disposed in receiving opening 150 in order to ensure contacting between radio module 210 and/or with electronic control system 170. Advantageously, this contact involves a touching/clamping contact, preferably a SIM card contacting system, in order to ensure data interchange between radio module 210 and/or electronic control system 170 of handheld light-emitting device 100. Second energy reservoir 140 is disposed, in receiving opening 150 that is depicted, detachably on radio module 210, for example by way of a clamping connection.

The interface circuit board can have additional electrical units and/or connecting elements, for example a SIM card or further plug connectors, in order to ensure data interchange with radio module 210 and/or with electronic control system 170 of handheld light-emitting device 100. Second energy reservoir 140 is disposed in receiving opening 150 on radio module 210 in clamped fashion. Module 300 is placed into receiving opening 150 and is held in receiving opening 150 with the aid of cover 160, module 300 being disposed in very largely clearance-free fashion in receiving opening 150, so that in turn rattling noises or the like are avoided and inadvertent detachment of module 300 is prevented. Module 300 can alternatively, for example, be clicked into receiving opening 150 by means of a click connection. In the variant depicted in FIG. 5, cover 160 is mountable on housing 120 rotationally, in particular by way of a bayonet closure; alternatively, a threaded closure would be possible. Cover 160 has a slot-shaped depression 164 in order furthermore to enable reliable but simple access to receiving opening 150 and to second energy reservoir 140 disposed therein and/or to radio module 210. Thanks to the slot-shaped depression 164, cover 160 can be opened, for example, using a coin or a screwdriver. A further embodiment (not depicted) is a swing-out cover, mounted pivotably around a pivot axis, which can be detachably immobilized on housing 120, on the side located oppositely from the pivot axis, by latching, threading, clamping, or wedging. A cover 160 of this kind can prevent the cover from possibly falling off, or can prevent loss of the cover.

Cover 160 can in principle be embodied in such a way that it follows a contour of housing 120 and terminates flush therewith. Cover 160 can correspondingly be made from various plastic materials such as PA6, PA6.6, polycarbonate (PC), acrylonitrile-butadiene-styrene copolymer (ABS), or of a material mix of different plastics, and/or can be glass-fiber-reinforced; it is advantageous if cover 160 encompasses the same material as housing 120 of handheld light-emitting device 100.

In addition to the embodiments that have been described and illustrated, further embodiments that can encompass further variations and combinations of features are also imaginable.

What is claimed is:

1. A handheld light-emitting device, comprising:
   an electronic control system that has a first circuit board dedicated to the electronics control system;
   a housing;
   a radio module for at least one of receiving information from at least one external interface and transmitting information to at least one external interface;
   a first energy reservoir via which energy is supplied to the handheld light-emitting device; and
   a second energy reservoir;
   wherein:
      the first and second energy reservoirs each comprises a battery; and
      the radio module:
         is provided together with the second energy reservoir as a single module that is independent of, and detachably mountable inside, the housing;
         is configured to perform a wireless data transfer via a radio network;
         has a second circuit board that is dedicated to the radio module and is separate from the first circuit board;
         is connected to the electronic control system of the handheld light-emitting device; and is configured to transmit control instructions to the electronic control system.

2. The handheld light-emitting device as recited in claim 1, wherein the radio module is electrically connected to at least one of the first energy reservoir and the second energy reservoir.

3. The handheld light-emitting device as recited in claim 1, wherein in a first case in which the first energy reservoir is present and possesses sufficient energy, the radio module is supplied with energy via the first energy reservoir, and in a case other than the first case the radio module is powered via the second energy reservoir.

4. The handheld light-emitting device as recited in claim 1, wherein the housing includes a receiving opening for receiving the second energy reservoir, the receiving opening being closable by way of a cover.

5. The handheld light-emitting device as recited in claim 4, wherein the cover is immobilized on the housing rotationally.

6. The handheld light-emitting device as recited in claim 5, wherein the cover is immobilized on the housing rotationally via one of a threaded closure, a bayonet closure, a flap closure, and at least one connecting element corresponding to at least one screw.

7. The handheld light-emitting device as recited in claim 1, wherein the second energy reservoir is configured replaceably.

8. The handheld light-emitting device as recited in claim 1, wherein the second energy reservoir is integrated fixedly inside the housing.

9. The handheld light-emitting device as recited in claim 1, wherein the second energy reservoir is rechargeable.

10. The handheld light-emitting device as recited in claim 9, wherein in a case in which the first energy reservoir is present and possesses sufficient energy, the second energy reservoir is charged with energy via the first energy reservoir.

11. The handheld light-emitting device as recited in claim 1, wherein the radio module is disposed in one of a pre-installed fashion, a retrofittable fashion, and a replaceable fashion inside the housing.

12. The handheld light-emitting device as recited in claim 1, wherein the interface circuit board is connected to an electronic control system of the handheld light-emitting device via at least one connecting element.

13. The handheld light-emitting device as recited in claim 1, wherein the interface circuit board is disposed inside the housing detachably, in particular in thread-mounted and/or clamped fashion, or nondetachably.

14. The handheld light-emitting device as recited claim 1, wherein the radio module at least one of receives and transmits a radio signal.

15. The handheld light-emitting device as recited in claim 14, wherein the radio signal includes one of a Bluetooth signal, a Bluetooth low energy signal, and a WLAN signal.

16. The handheld light-emitting device as recited in claim 1, wherein the handheld light-emitting device is a portable handheld light-emitting device.

17. The handheld light-emitting device as recited in claim 1, wherein the handheld light-emitting device is a work light.

18. The handheld light-emitting device as recited in claim 1, wherein the battery of the first energy reservoir is a battery pack.

19. The handheld light-emitting device as recited in claim 1, wherein the second circuit board is disposed inside the housing detachably in one of thread-mounted fashion, clamped fashion, and nondetachable fashion.

20. A system, comprising:
a radio network;
an external interface; and
a handheld light-emitting device that includes:
    a first energy reservoir via which energy is supplied to the handheld light-emitting device;
    a second energy reservoir;
    an electronic control system that has a first circuit board dedicated to the electronics control system;
    a housing;
    a radio module for at least one of receiving information from the external interface and transmitting information to the external interface;
wherein:
    the first and second energy reservoirs each comprises a battery; and
    the radio module:
        is provided together with the second energy reservoir as a single module that is independent of, and detachably mountable inside, the housing
        is configured to send information to and/or receive information from the external interface
        is configured to perform a wireless data transfer via the radio network
        has a second circuit board that is dedicated to the radio module and is separate from the first circuit board; and
        is connected to, and configured to transmit control instructions to, the electronic control system.

21. The system as recited in claim 20, wherein the external interface is one of a smartphone and an electrical data processing system.

* * * * *